US008380572B2

(12) United States Patent
Mehta et al.

(10) Patent No.: US 8,380,572 B2
(45) Date of Patent: Feb. 19, 2013

(54) SELECTING AMONG ADVERTISEMENTS COMPETING FOR A SLOT ASSOCIATED WITH ELECTRONIC CONTENT DELIVERED OVER A NETWORK

(75) Inventors: Bhavesh Mehta, Cupertino, CA (US); Michael D. Bigby, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1102 days.

(21) Appl. No.: 10/648,599

(22) Filed: Aug. 25, 2003

(65) Prior Publication Data
US 2005/0049915 A1 Mar. 3, 2005

(51) Int. Cl.
*G06Q 30/00* (2006.01)
(52) U.S. Cl. .................................. 705/14.49; 705/14.73
(58) Field of Classification Search .................. 709/225; 705/26, 14, 14.49, 14.73; 725/34
See application file for complete search history.

(56) References Cited

U.S. PATENT DOCUMENTS

| | | |
|---|---|---|
| 5,848,397 A | 12/1998 | Marsh et al. |
| 5,933,811 A | 8/1999 | Angles et al. |
| 5,948,061 A | 9/1999 | Merriman et al. |
| 6,253,189 B1 | 6/2001 | Feezell et al. |
| 6,487,538 B1 | 11/2002 | Gupta et al. |
| 6,760,916 B2 | 7/2004 | Holtz et al. |
| 6,804,659 B1 | 10/2004 | Graham et al. |
| 6,907,566 B1 | 6/2005 | McElfresh et al. |
| 6,928,414 B1 | 8/2005 | Kim |
| 7,100,111 B2 | 8/2006 | McElfresh et al. |
| 7,249,059 B2 | 7/2007 | Dean et al. |
| 7,373,599 B2 | 5/2008 | McElfresh et al. |
| 7,472,102 B1 | 12/2008 | Heckerman et al. |
| 7,562,064 B1 | 7/2009 | Chickering et al. |
| 2001/0056489 A1 * | 12/2001 | Ariga ............................ 709/225 |
| 2002/0128904 A1 * | 9/2002 | Carruthers et al. ............. 705/14 |

(Continued)

FOREIGN PATENT DOCUMENTS

| | | | |
|---|---|---|---|
| KR | 2001000688 A | * | 1/2001 |
| WO | WO 97/21183 | | 6/1997 |

(Continued)

OTHER PUBLICATIONS

U.S. Appl. No. 09/558,755, filed Apr. 21, 2000, incorporated by reference into US Patent Application Publication 2002/0128904 (Carruthers et al).*

(Continued)

*Primary Examiner* — Michael Bekerman
(74) *Attorney, Agent, or Firm* — Hickman Palermo Truong Becker Bingham Wong LLP

(57) ABSTRACT

Techniques are provided for selecting among the advertisements that are competing for a slot based, at least in part, on an "schedule sequence" that is established for the advertisements. The schedule sequence may, for example, reflect the relative times at which a content provider incurred the delivery obligations associated with the advertisements. For the purpose of establishing the sequence, the date on which an advertisement order is placed may be considered to be the date on which the corresponding delivery obligations are incurred. After the sequence has been established, the position of competing advertisements within the schedule sequence is used as one of the factors for determining which competing ad to place in a slot, where ads nearer the beginning of the sequence (ads with earlier-incurred delivery obligations) are favored over ads that are nearer the end of the sequence (ads with later-incurred delivery obligations).

16 Claims, 2 Drawing Sheets

U.S. PATENT DOCUMENTS

| | | |
|---|---|---|
| 2002/0133398 A1 | 9/2002 | Geller et al. |
| 2003/0028432 A1 | 2/2003 | Troyansky et al. |
| 2003/0101454 A1 | 5/2003 | Ozer et al. |
| 2003/0130887 A1 | 7/2003 | Nathaniel |
| 2003/0135460 A1 | 7/2003 | Talegon |
| 2003/0149618 A1 | 8/2003 | Sender et al. |
| 2004/0003398 A1* | 1/2004 | Donian et al. ............ 725/34 |
| 2004/0103024 A1 | 5/2004 | Patel et al. |
| 2005/0149396 A1 | 7/2005 | Horowitz et al. |
| 2010/0082439 A9 | 4/2010 | Patel et al. |

FOREIGN PATENT DOCUMENTS

WO    WO 03/052651 A2    6/2003

OTHER PUBLICATIONS

Machine Translation of KR2001-0000688 to CHOI, "New Internet Auction", published Jan. 5, 2001.*

Dukes et al., "Negotiations and Exclusivity Contracts for Advertising," Marketing Science, Spring 2003 (25 pages).

* cited by examiner though the content is being delivered over a network.

SELECTING AMONG ADVERTISEMENTS COMPETING FOR A SLOT ASSOCIATED WITH ELECTRONIC CONTENT DELIVERED OVER A NETWORK

FIELD OF THE INVENTION

The present invention relates to delivering advertisements with electronic content provided over a network and, more specifically, to techniques for selecting among advertisements that are competing for a slot associated with electronic content that is to be delivered over a network.

BACKGROUND OF THE INVENTION

Electronic content is delivered to network users in many forms, such as email, web pages, audio streams, video streams and Java applets. Many companies (hereinafter "advertisers") advertise their wares and services by paying popular content providers (hereinafter "providers") to include the advertisers' advertisements in the providers' content as that content is delivered to users.

Just as the form of the content may vary, so too may the form of the advertisement. For example, when the content is a web page the advertisement may be a banner ad. When the content is an email message, the advertisement may be text in a tag line. When the content is a stream of music or video, the advertisement may be a sound bite or video clip. The techniques described herein are not limited to any particular form of network-delivered content or advertisements.

The effectiveness of an advertisement greatly depends on the circumstances under which it is received. For example, an advertisement about football merchandise is more likely to be effective when viewed by people interested in football, than when viewed by people interested in breakthroughs in the treatment of arthritis. Consequently, the contract between the advertiser and the provider frequently specifies the conditions under which the provider will provide an advertisement. Such conditions, referred to herein as the "delivery conditions" of the advertisement, may include such specifics as (1) the manner of including the advertisement in the content (e.g. what size and position on a web page), (2) criteria for content that the advertisement will accompany, and (3) criteria for the users to which the advertisement should be delivered. For example, a seller of football merchandise may require that its advertisement be delivered on the top of pages that contain news stories relating to football, and where the recipients are males between the ages of 20 and 50.

In addition to the delivery conditions, the contract between the advertiser and the provider also identifies specific "delivery obligations". The delivery obligations set forth the advertisers obligations relative to delivering the advertisement. The delivery obligation for a particular advertisement may, for example, obligate the provider to provide 10,000 "ad-views" of the advertisement during a particular time period. Each time a content provider provides to a user content that includes the particular advertisement, an "ad-view" of the particular advertisement is said to have occurred.

An ad-view is merely one form of "service unit" that an advertiser may purchase from a provider. Various other forms of service units are possible, including but not limited to: actual click-throughs on advertisements, actual viewing time of advertisements, actual orders resulting from advertisements, etc. The techniques described herein are not limited to any particular form of service unit.

For the purpose of explanation, a particular delivery of a particular piece of content can be considered to have a specific number of "slots" into which advertisements may be placed. For example, a particular web page that is being delivered to a particular user may include two slots for advertisements: one slot for a horizontal banner at the top of the page, and one slot for vertical banner on the right hand side of the page. Similarly, a particular video feed may have one slot for a one-minute video clip advisement at the start of the feed, and one slot for a two-minute video clip advertisement during the middle of the feed.

Each slot is associated with a set of "slot attributes". The slot attributes associated with a slot may include, for example, the nature of the content that contains the slot, the size and placement of the slot within that content, and the characteristics of the user to which the content is being delivered. For example, a slot may have the attributes: "content=web page containing sports story", "recipient=29 year old male", "size=large banner", "placement=top of page". To determine whether a particular advertisement can be placed in a particular slot, the delivery characteristics of the advertisement are compared to the slot attributes of the slot.

To maximize revenue, providers typically attempt to enter into contracts with enough advertisers to ensure that every slot of every piece of delivered content is filled by a paid advertisement. Thus, a provider typically enters agreements with many advertisers. As a consequence, it is possible for multiple advertisements to qualify for the same slot.

For example, assume that a provider considers it optimal to display a single advertisement on web pages that include stories about sports. Thus, each page about sports that the provider delivers to a user has a single slot. Further assume that the provider has contracted with one advertiser to provide 2,000 ad-views of advertisement X on pages that contain sports stories during a particular month, and with another advertiser to provide 1,000 ad-views of advertisement Y on pages that contain sports stories during that same month. Under these circumstances, both advertisement X and advertisement Y qualify for inclusion in the slot of web pages that contain sports stories. Consequently, during that particular month, every time the provider is to deliver a web page containing a sports story, the provider must determine whether to include advertisement X or advertisement Y.

Thus, from the perspective of the provider, there are many circumstances where multiple advertisements are "competing" for the same slot. The simplest technique for dealing with such situations is for the advertiser to simply provide one advertisement until that advertisement's delivery obligations have been satisfied, and then move on to the next competing advertisement and do the same. For example, the advertiser may simply provide advertisement X with the first 2,000 pages that contain a sports story, and then provide advertisement Y with the next 1,000 pages that contain a sports story.

Unfortunately, it may turn out that the provider receives insufficient requests for particular types of content to satisfy all of its delivery obligations. For example, during the month in which the provider has contracted to provide ad-views for advertisements X and Y, the provider may only receive 2000 requests for sports stories. Under these conditions, the content provider would not be able to satisfy its delivery obligations for both advertisement X and advertisement Y. Situations in which the content requests received by a provider do not allow the provider to achieve all of its delivery obligations are referred to herein as "shortfall" situations. How providers deal with shortfall situations can greatly affect the satisfaction level of the advertisers.

One technique for handling multiple competing delivery obligations involves using a "behindness" measure to select among the advertisements that are competing for a slot. In general, the behindness value of an advertisement reflects how far behind the provider is on satisfying the delivery obligations associated with the advertisement. For example, a behindness measure may indicate what percentage of the advertisement's delivery obligation will not be satisfied given (1) how much of the delivery obligation has been satisfied, and (2) how much of the obligation period has passed.

For example, assume that the provider is obligated to provide 2000 ad-views of advertisement X during a particular month. If the provider has provided 1000 ad-views of advertisement X when the month is half over, then the provider is "on track" relative to the delivery obligations of advertisement X, and the behindness value for advertisement X is 1 (50% obligation remaining/50% time-remaining). On the other hand, if the provider has only provided 500 ad-views of advertisement X when the month is half over, then advertisement X has a behindness value of 1.5 (75% obligation remaining/50% time-remaining). This is merely one example of how a behindness value may be calculated. The techniques described herein are not limited to any particular formula for calculating a behindness value.

One way of using a behindness measure to select among the advertisements that are competing for a slot involves always selecting the qualifying advertisement with the highest behindness value. By selecting the qualifying advertisement with the highest behindness value, the provider ensures that approximately the same percentage of every order is satisfied during a shortfall situation.

Unfortunately, the most-behind-first approach has some significant disadvantages that may lead to perceived or actual unfairness. For example, an advertiser may be interested in advertising in slots that are already subject to several pre-existing obligations. If the advertiser becomes aware of the pre-existing obligations, the advertiser may contract for a much higher delivery obligation than the advertiser actually desires. The consequence of such a contract could be to significantly reduce the number of slots assigned to the previously contracted advertisers, while potentially given the latecomer advertiser exactly the number of slots the advertiser actually desires.

Based on the foregoing, it is clearly desirable to provide a technique for selecting which advertisement to include in a particular slot, when a plurality of advertisements are competing for inclusion in the same slot. It is further desirable that the selection technique provide a fair and efficient way of dealing with shortfall situations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
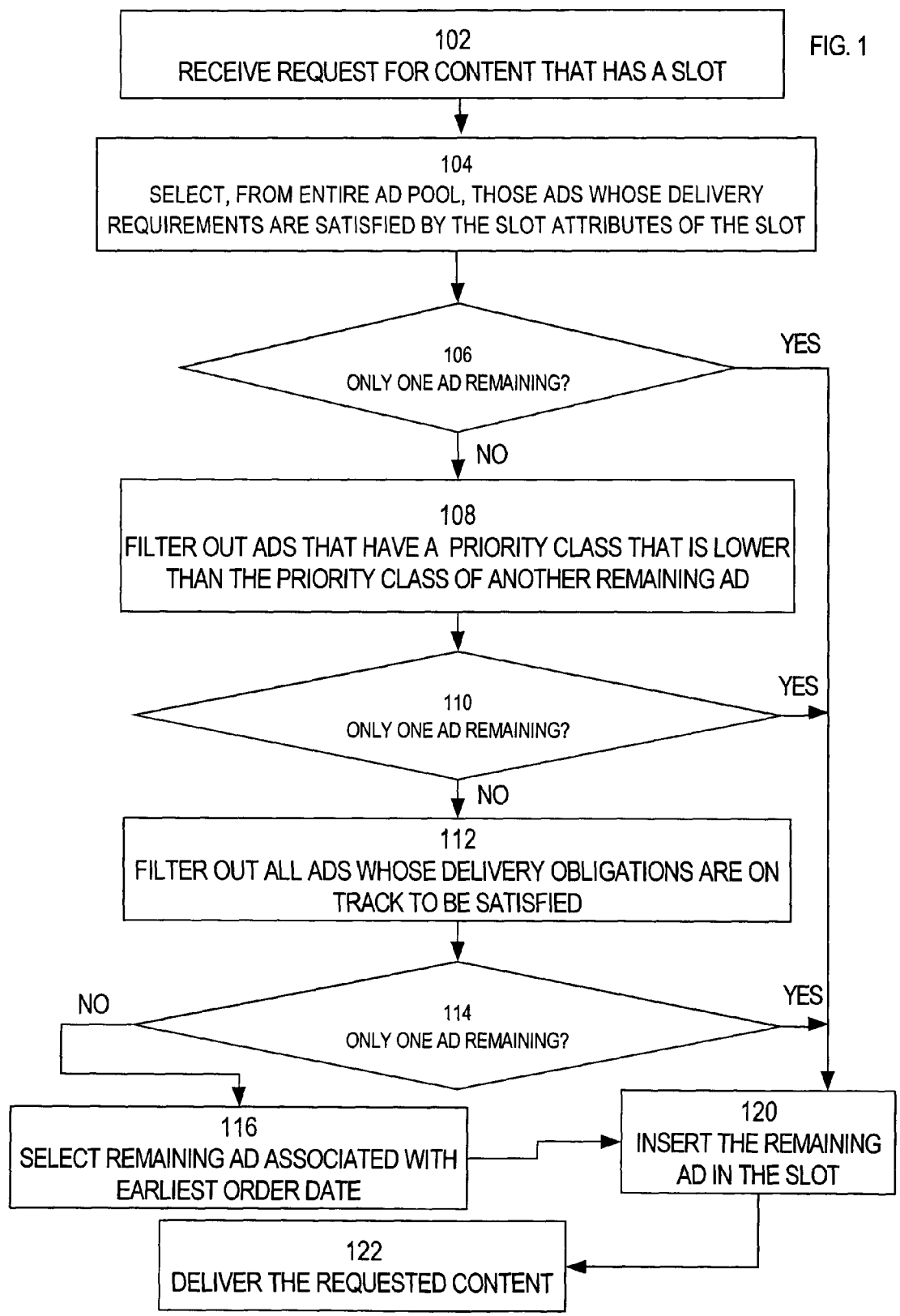
FIG. 1 is a block diagram of a flowchart for selecting ad, among a plurality of competing ads, to select for a slot associated with electronic content that has been requested over a network.

Techniques are provided for selecting among advertisements that are competing for a slot associated with electronic content that is to be delivered over a network. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

AD SELECTION BASED ON SCHEDULE SEQUENCE

To avoid the situation in which latecomer advertisers are able to "game the system" to adversely affect pre-existing advertising contracts, techniques are described herein for selecting among the advertisements that are competing for a slot based, at least in part, on an "schedule sequence" that is established for the advertisements. According to one embodiment, the sequence reflects the relative times at which the provider incurred the delivery obligations associated with the advertisements. For example, if a provider incurs delivery obligations for ad X before incurring delivery obligations for ad Y, then ad X would precede ad Y in the schedule sequence. According to one embodiment, the date on which an advertisement order is placed is considered to be the date on which the corresponding delivery obligations are incurred.

After the schedule sequence has been established, the position of competing advertisements within the schedule sequence is used as one of the factors for determining which competing ad to place in a slot, where ads nearer the beginning of the sequence (ads with earlier-incurred delivery obligations) are favored over ads that are nearer the end of the sequence (ads with later-incurred delivery obligations). For example, if all other factors are equal, the selection mechanism would select ad X over ad Y due to the fact that ad X is positioned ahead of ad Y in the schedule sequence.

Various benefits result from using the obligation sequence of ads as a factor in the selection of which of the competing ads to include in a slot. Specifically, when the order date is a selection factor, the service level that an advertiser will actually receive is much more predictable at the time the contract is formed, since later-formed contracts are less able to adversely affect the level of service the advertiser will receive. Similarly, latecomers are less able to game the system, since they are less able to shift slots from earlier-formed contracts to themselves by inflating the delivery obligations associated with their advertisements.

SELECTING TECHNIQUE EXAMPLE

As mentioned above, techniques are described herein for using a sequence metric, such as "order date", as a factor in determining which ad to assign to a slot when there exist multiple ads that are competing for the slot. According to one embodiment, the selection process takes into account a variety of other factors as well, such as (1) whether the delivery obligations of the ad are on track to be satisfied, and (2) the priority class to which the advertisements belong. With respect to priority class, the advertisements may be divided up, for example, so that ads associated with "guaranteed" contracts have a first priority, and ads associated with "not guaranteed" contracts have a second priority.

According to one embodiment, the selection process takes these factors into account by selecting which ad to insert into a slot based on the following rules:
  (1) filter out all advertisements that have delivery criteria that are not satisfied by the attributes of the slot;
  (2) filter out all advertisements that are not in the highest remaining priority class;

(3) filter out all advertisements whose delivery obligations are on track to be satisfied; and (4) select the remaining ad that is associated with the earliest order date.

Referring to FIG. 1, it illustrates a flowchart for selecting which ad, from a pool of ads, to insert into a slot associated with content that has been requested by a user. At step 102, a request is received for content that has a slot. Such a request may be, for example, a request for a web page that a web server receives from a user over the Internet. At step 104, the ad selection mechanism determines which ads, among the ads in the entire ad pool, have delivery requirements that are satisfied by the slot attributes of the slot. This determination, which is made in response to receipt of the request, may involve a significant amount of computational resources given the number of active advertisement contracts the provider may have entered, the number of criteria that can be associated with each advertisement, and the number of attributes that can be associated with a given slot.

If the delivery requirements of only one ad are satisfied by the slot attributes, then control passes from step 106 to step 120, where the only qualifying ad is inserted into the slot, and from step 120 to step 122, where the requested content is delivered to the user that issued the request.

On the other hand, if the delivery requirements of more than one ad are satisfied by the slot attributes, then control passes to step 108. At step 108, ads that have a priority class that is lower than the priority class of another remaining ad are filtered out of the pool. For example, if the ad pool that remains after step 104 includes two first priority ads and three second priority ads, then during step 104 the three second priority ads would be filtered out of the remaining set of qualifying ads.

If, after filtering out the lower priority ads, only one ad remains, then control passes from step 110 to step 120, where the one remaining ad is inserted into the slot, and from step 120 to step 122, where the requested content is delivered to the user that issued the request.

On the other hand, if more than one ad remains after the lower priority ads have been filtered, then control passes to step 112. At step 112, all ads whose delivery obligations are on track to be satisfied are filtered out from the remaining pool of qualifying ads. If after step 112 only one ad remains, control passes from step 114 to step 120, where the one remaining ad is inserted into the slot, and from step 120 to step 122, where the requested content is delivered to the user that issued the request.

On the other hand, if more than one ad remains after the "on track" ads are filtered out, then control passes from step 114 to step 116. At step 116, the remaining ad associated with the earliest order date is selected for insertion. Control then passes to step 120, where the selected ad is inserted into the slot, and from step 120 to step 122, where the requested content is delivered to the user that issued the request.

HARDWARE OVERVIEW

Figure 2:
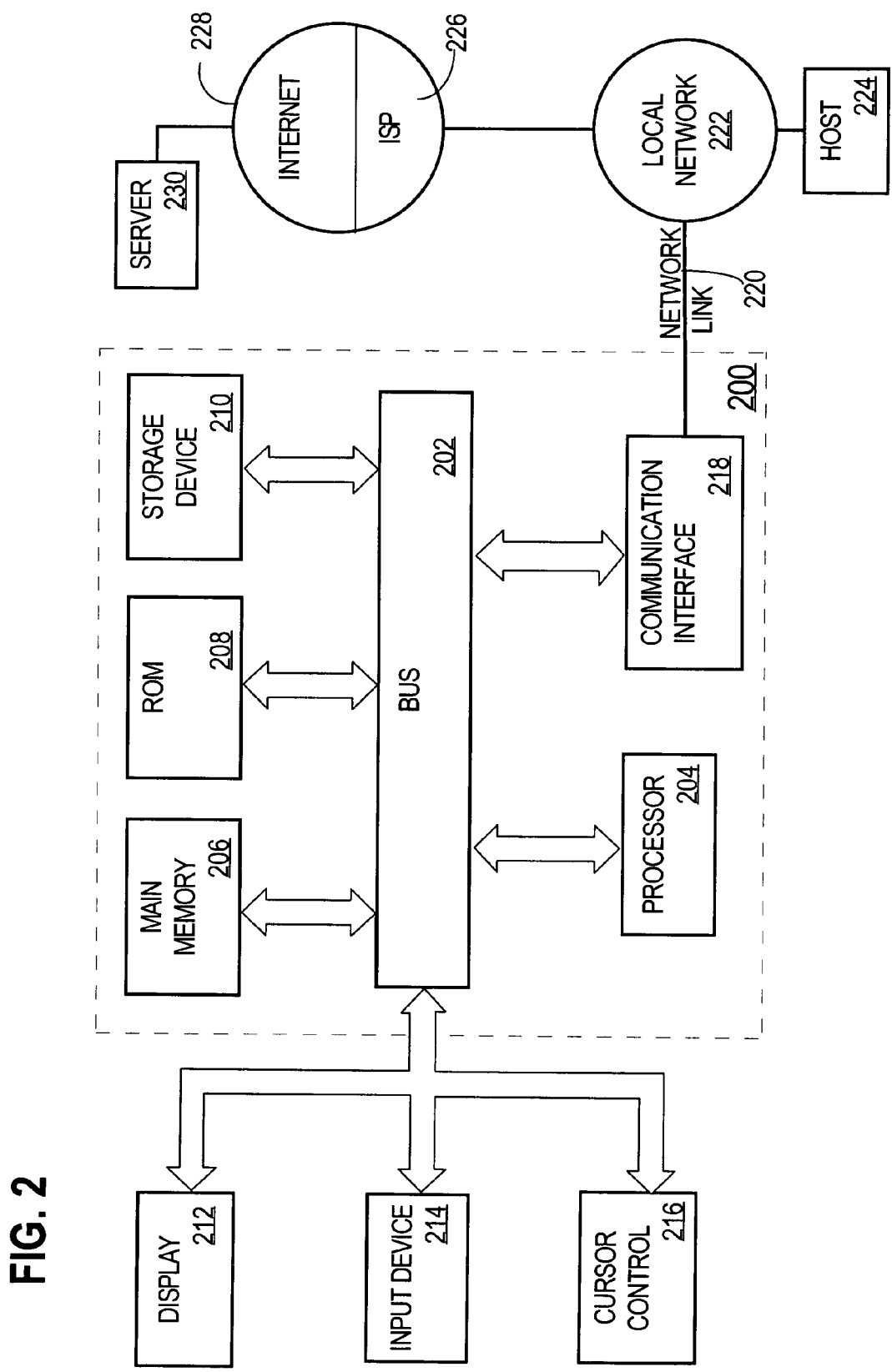
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining which advertisements to include with electronic content delivered to users over a network, the method comprising the steps of:

after accepting a first contract with a first advertiser, accepting a second contract with a second advertiser;

wherein delivery obligations associated with the second contract are such that fulfillment of the second contract would likely prevent delivery obligations associated with the first contract from being fulfilled;

storing data that indicates delivery criteria and delivery obligations for each of a plurality of contracts, wherein each contract is associated with an advertiser of a plurality of advertisers, wherein the plurality of contracts includes the first contract and the second contract;

wherein the plurality of advertisers includes the first advertiser and the second advertiser;

wherein each contract of the plurality of contracts is associated with a separate advertisement of a plurality of advertisements;

after the plurality of contracts have been formed, receiving, from a user, a request to provide over said network a piece of electronic content that includes a slot for an advertisement;

wherein the piece of electronic content has a subject;

wherein the subject of the piece of electronic content is an attribute of the slot that is included in the piece of electronic content;

in response to receiving the request:

reading said data to determine delivery criteria associated with the plurality of contracts;

comparing slot attributes of said slot in the requested electronic content with delivery criteria of said plurality of contracts to determine a subset of said plurality of advertisements which qualify for inclusion in said slot, wherein the subject of the piece of electronic content is one of the slot attributes compared with the delivery criteria, wherein both a first advertisement associated with the first contract and a second advertisement associated with the second contract qualify for inclusion in said slot, wherein the second contract is associated with a behindness value that is currently greater than a behindness value associated with the first contract, wherein the behindness value of each contract reflects how far behind a content provider is on satisfying the delivery obligations associated with each contract; and from said subset of said plurality of advertisements, selecting said first advertisement to include in the slot based, at least in part, on the first contract having been formed before the second contract;

inserting said first advertisement into the slot to create a modified piece of electronic content;

delivering, as a response to the request, the modified piece of electronic content to the user;

wherein the steps of receiving, reading, comparing, selecting, inserting, and delivering are performed on one or more computing devices.

2. The method of claim 1, wherein:

the method further comprises the step of determining which advertisements in the plurality of advertisements are associated with delivery obligations that are not on track to be satisfied; and the step of determining a subset of said plurality of advertisements which qualify for inclusion in said slot includes selecting, for said subset, only advertisements that are associated with delivery obligations that are not on track to be satisfied.

3. The method of claim 1, wherein the step of comparing slot attributes of said slot with delivery criteria of said plurality of contracts to determine a subset of said plurality of advertisements which qualify for inclusion in said slot is performed in response to receiving said request.

4. The method of claim 3, wherein:
the request was made by a specific user; and
at least one of said slot attributes, which are used to determine which advertisements qualify for inclusion in said slot, corresponds to information associated with the specific user.

5. The method of claim 1, wherein the piece of electronic content is a web page.

6. The method of claim 1, wherein the piece of electronic content is a video stream.

7. The method of claim 1, further comprising the steps of:
associating a priority class with each of said plurality of advertisements; and
filtering out, of said subset, one or more advertisements that have a priority class that is lower than the priority class of any other advertisement that belongs to said subset.

8. The method of claim 1, further comprising the step of filtering out, of said subset, all advertisements that are associated with delivery obligations that are on track to be satisfied.

9. A computer-readable storage medium storing instructions for determining which advertisements to include with electronic content delivered to users over a network, which instructions, when executed by one or more processors, causes the one or more processors to perform the steps of:
after accepting a first contract with a first advertiser, accepting a second contract with a second advertiser;
wherein delivery obligations associated with the second contract are such that fulfillment of the second contract would likely prevent delivery obligations associated with the first contract from being fulfilled;
storing data that indicates delivery criteria and delivery obligations for each of a plurality of contracts, wherein each contract is associated with an advertiser of a plurality of advertisers,
wherein the plurality of contracts includes the first contract and the second contract;
wherein the plurality of advertisers includes the first advertiser and the second advertiser;
wherein each contract of the plurality of contracts is associated with a separate advertisement of a plurality of advertisements;
after the plurality of contracts have been formed, receiving, from a user, a request to provide over said network a piece of electronic content that includes a slot for an advertisement;
wherein the piece of electronic content has a subject;
wherein the subject of the piece of electronic content is an attribute of the slot that is included in the piece of electronic content;
in response to receiving the request:
reading said data to determine delivery criteria associated with the plurality of contracts;
comparing slot attributes of said slot in the requested electronic content with delivery criteria of said plurality of contracts to determine a subset of said plurality of advertisements which qualify for inclusion in said slot, wherein the subject of the piece of electronic content is one of the slot attributes compared with the delivery criteria,
wherein both a first advertisement associated with the first contract and a second advertisement associated with the second contract qualify for inclusion in said slot,
wherein the second contract is associated with a behindness value that is currently greater than a behindness value associated with the first contract,
wherein the behindness value of each contract reflects how far behind a content provider is on satisfying the delivery obligations associated with each contract; and
from said subset of said plurality of advertisements, selecting said first advertisement to include in the slot based, at least in part, on the first contract having been formed before the second contract;
inserting said first advertisement into the slot to create a modified piece of electronic content;
delivering, as a response to the request, the modified piece of electronic content to the user.

10. The computer-readable storage medium of claim 9, wherein:
the instructions include instructions which, when executed by the one or more processors, further cause the one or more processors to perform the step of determining which advertisements in the plurality of advertisements are associated with delivery obligations that are not on track to be satisfied; and
the step of determining a subset of said plurality of advertisements which qualify for inclusion in said slot includes selecting, for said subset, only advertisements that are associated with delivery obligations that are not on track to be satisfied.

11. The computer-readable storage medium of claim 9, wherein the instructions include instructions which, when executed by the one or more processors, further cause the one or more processors to perform the step of comparing slot attributes of said slot with delivery criteria of said plurality of contracts to determine a subset of said plurality of advertisements which qualify for inclusion in said slot is performed in response to receiving said request.

12. The computer-readable storage medium of claim 11, wherein:
the request was made by a specific user; and
at least one of said slot attributes, which are used to determine which advertisements qualify for inclusion in said slot, corresponds to information associated with the specific user.

13. The computer-readable storage medium of claim 9, wherein the piece of electronic content is a web page.

14. The computer-readable storage medium of claim 9, wherein the piece of electronic content is a video stream.

15. The computer-readable storage medium of claim 9, wherein the instructions include instructions which, when executed by the one or more processors, further cause the one or more processors to perform the steps of:
associating a priority class with each of said plurality of advertisements; and
filtering out, of said subset, one or more advertisements that have a priority class that is lower than the priority class of any other advertisement that belongs to said subset.

16. The computer-readable storage medium of claim 9, wherein the instructions include instructions which, when executed by the one or more processors, further cause the one or more processors to perform the step of filtering out, of said subset, all advertisements that are associated with delivery obligations that are on track to be satisfied.

* * * * *